United States Patent
Williams et al.

(10) Patent No.: US 10,306,683 B2
(45) Date of Patent: *May 28, 2019

(54) TRANSMISSION OPPORTUNITY SCHEDULING

(71) Applicant: Cable Television Laboratories, Inc., Louisville, CO (US)

(72) Inventors: Thomas H. Williams, Fairways Dr., CO (US); Matthew D. Schmitt, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 295 days.

This patent is subject to a terminal disclaimer.

(21) Appl. No.: 15/083,126

(22) Filed: Mar. 28, 2016

(65) Prior Publication Data

US 2016/0212657 A1    Jul. 21, 2016

Related U.S. Application Data

(63) Continuation of application No. 13/759,908, filed on Feb. 5, 2013, now Pat. No. 9,300,458.

(51) Int. Cl.
*H04W 74/08*   (2009.01)
*H04L 5/00*    (2006.01)
*H04W 72/12*   (2009.01)

(52) U.S. Cl.
CPC ......... *H04W 74/085* (2013.01); *H04L 5/0005* (2013.01); *H04L 5/0071* (2013.01); *H04L 5/0073* (2013.01); *H04W 72/1231* (2013.01); *H04W 72/121* (2013.01)

(58) Field of Classification Search
CPC ... H04L 5/0005; H04L 5/0071; H04L 5/0073; H04W 28/00; H04W 28/044; H04W 72/123; H04W 72/121; H04W 72/1205; H04W 71/1231; H04W 28/04; H04W 74/085
USPC ........................................................ 370/468
See application file for complete search history.

(56) References Cited

U.S. PATENT DOCUMENTS

| | | | | |
|---|---|---|---|---|
| 5,448,621 A * | 9/1995 | Knudsen | ............ | H04B 7/18539 370/329 |
| 2002/0159513 A1 * | 10/2002 | Williams | ............ | H04L 12/5602 375/222 |
| 2006/0018366 A1 * | 1/2006 | Fluxman | ............ | H04B 1/7115 375/148 |
| 2007/0291702 A1 * | 12/2007 | Nanba | ............ | H04J 3/00 370/336 |
| 2008/0008127 A1 * | 1/2008 | Choi | ............ | H04J 11/0069 370/331 |
| 2008/0008206 A1 * | 1/2008 | Cho | ............ | H04B 1/713 370/430 |
| 2009/0046617 A1 * | 2/2009 | Tenny | ............ | H04L 5/0064 370/312 |

(Continued)

*Primary Examiner* — Rownak Islam
(74) *Attorney, Agent, or Firm* — Great Lakes Intellectual Property, PLLC (57) ABSTRACT

Scheduling of transmission opportunities to prevent collisions is contemplated. The transmission opportunities may be scheduled for terminal units where transmissions of one terminal unit may collide or otherwise interfere with transmissions of another terminal unit. The transmission opportunities may be scheduled according to a time-frequency grid to prevent collisions in a time domain and/or a frequency domain.

19 Claims, 3 Drawing Sheets

(56) References Cited

U.S. PATENT DOCUMENTS

| | | | |
|---|---|---|---|
| 2009/0061939 A1* | 3/2009 | Andersson | H04B 7/082 455/562.1 |
| 2009/0122708 A1 | 5/2009 | Wang et al. | |
| 2010/0177717 A1 | 7/2010 | Sung et al. | |
| 2010/0189048 A1* | 7/2010 | Baker | H04L 5/0037 370/329 |
| 2010/0189069 A1* | 7/2010 | Sahinoglu | H04L 5/0007 370/330 |
| 2010/0309935 A1 | 12/2010 | Broadcom | |
| 2011/0134935 A1* | 6/2011 | Campos | H04J 3/1647 370/436 |
| 2012/0163318 A1* | 6/2012 | Kishiyama | H04B 7/0671 370/329 |
| 2013/0051358 A1 | 2/2013 | Renesas | |

* cited by examiner

TRANSMISSION OPPORTUNITY SCHEDULING

CROSS-REFERENCE TO RELATED APPLICATIONS

This application is a continuation of U.S. application Ser. No. 13/759,908 filed Feb. 5, 2013, the benefit and disclosure of which is incorporated in its entirety by reference herein.

TECHNICAL FIELD

The present invention relates to scheduling transmission opportunities, such as but not necessarily limited to scheduling transmission opportunities for terminal units configured to facilitate wireless, wireline or optical signaling.

BACKGROUND

Some combination of wireless, wireline and/or optical signaling mediums may be used to facilitate transmissions between a plurality of terminal units and an access point or other devices configured to facilitate further transmissions. In order to maximize throughput capabilities, it can be beneficial to allow multiple terminal units to transmit at the same time. The transmissions of one terminal unit may collide or otherwise interfere with transmissions of another terminal unit transmitting at the same time if the corresponding transmission is not properly scheduled. The present invention relates to scheduling transmission opportunities in order to prevent the transmissions of one terminal unit from colliding with or otherwise interfering with transmissions of another terminal unit scheduled for transmission at the same time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
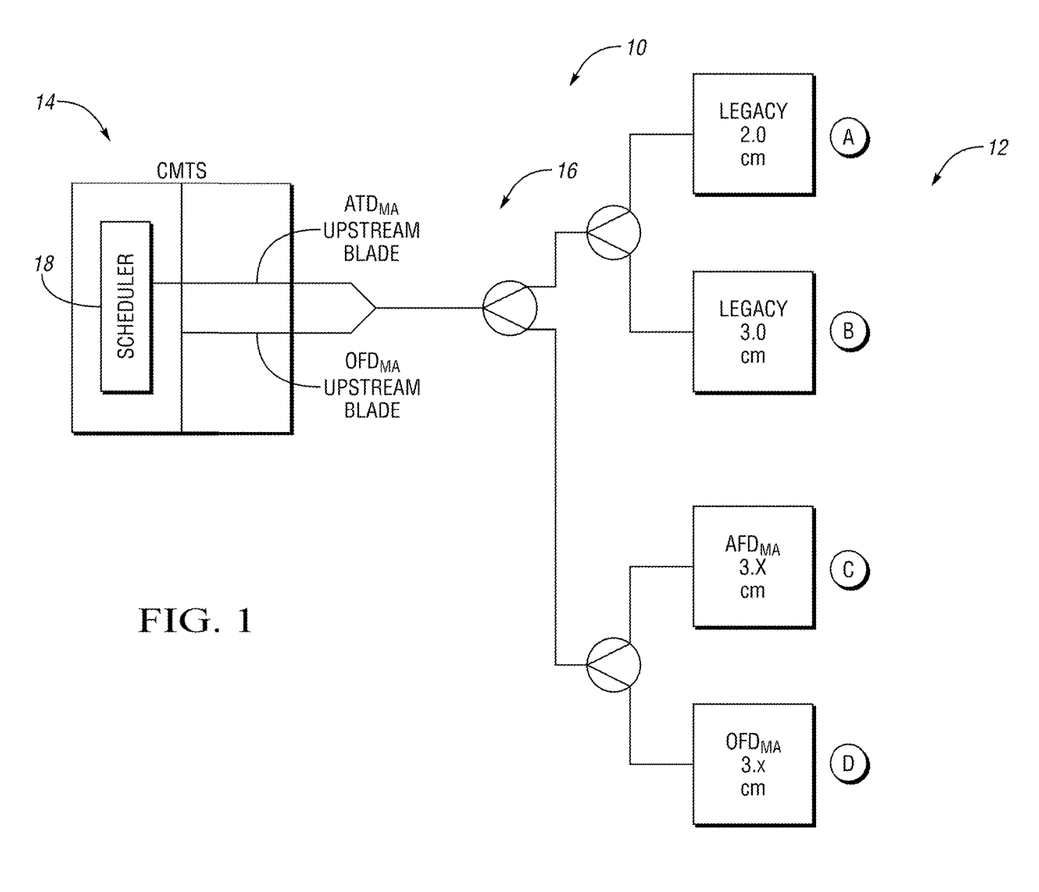
FIG. 1 illustrates a communication system in accordance with one non-limiting aspect of the present invention.

FIG. 1 illustrates a communication system 10 in accordance with one non-limiting aspect of the present invention. The communication system 10 includes a plurality of terminal units 12 configured to transmit with an access point 14 over a common communication medium 16. The access point 14 may be configured to communicate with the Internet or another network (not shown). The access point 14 may include a scheduler 18 configured to facilitate scheduling transmission opportunities, intervals or other transmission parameters for the terminal units 12 depending on its particular operating capabilities. The transmission opportunities may be scheduled in accordance with the present invention to prevent transmissions of one terminal unit 12 from colliding with or otherwise undesirably interfering with transmissions associated with another one of the terminal units 12 configured to transmit over the common communication medium 16.

The terminal units 12 are illustrated for exemplary non-limiting purposes to be cable modems 12 configured to facilitate transmissions with an access point 14, which may be a cable modem termination system (CMTS) 14. The CMTS 14 and/or the cable modems 12 may be configured in accordance with Data Over Cable Service Interface Specification (DOCSIS) 1.1/2.0/3.0), the disclosures of which are hereby incorporated by reference in their entirety. FIG. 1 illustrates a cable modem A as a legacy DOCSIS 2.0 cable modem, a cable modem B as a legacy DOCSIS 3.0 cable modem and cable modems C, D as DOCSIS 3.x cable modems. These designations are provided in order to illustrate some of the cable modems 12 having disparate operating capabilities. In particular, the legacy DOCSIS 2.0 configured cable modem A is contemplated to be configured to facilitate time domain multiple access (TDMA) transmissions at a single frequency bandwidth (e.g., 3.2 MHz), the legacy DOCSIS 3.0 cable modem B is contemplated to be configured to facilitate TDMA transmissions at multiple frequencies and bandwidths (e.g., 3.2 MHz or 6.4 MHz), and the DOCSIS 3.x cable modems are contemplated to be configured to facilitate frequency domain multiple access (FDMA), orthogonal frequency domain multiple access (OFDMA) and/or single carrier frequency domain multiple access (SC-FDMA) transmissions at an adjustable frequency bandwidth (e.g., 3.2 MHz-42 MHz, or more).

These particular operating characteristics of the cable modems 12 are provided for non-limiting purposes in order to demonstrate the capabilities of the present invention to schedule transmission opportunities for terminal units 12 having disparate operating capabilities. The noted operating characteristics are particular to cable modems 12 configured to facilitate transmissions over a coaxial cable 16 or hybrid fiber optic (HFC) network, and are not intended to necessarily limit the scope and contemplation of the present invention. The scheduler 18 contemplated by the present invention may be configured to facilitate scheduling transmission opportunities for other types of communication mediums 16, including those comprised partly or completely of wireless, wireline or optical infrastructures. The scheduler 18 contemplated by the present invention may also be configured to facilitate scheduling transmission opportunities for other types of terminal units 12, including terminal units configured as or included as part of a mobile phone, a cellular phone, a computer, a gateway, etc. The scheduler 18 described herein adapts to the time domain and frequency domain limitations of the illustrated cable modems 12 in order to schedule transmission opportunities to avoid collision. The scheduler 18 may be configured to leverage any other particular transmission limitation of the terminal units 12 to avoid collisions, which may vary depending on the type or operating capabilities of the terminal unit 12.

Figure 2:
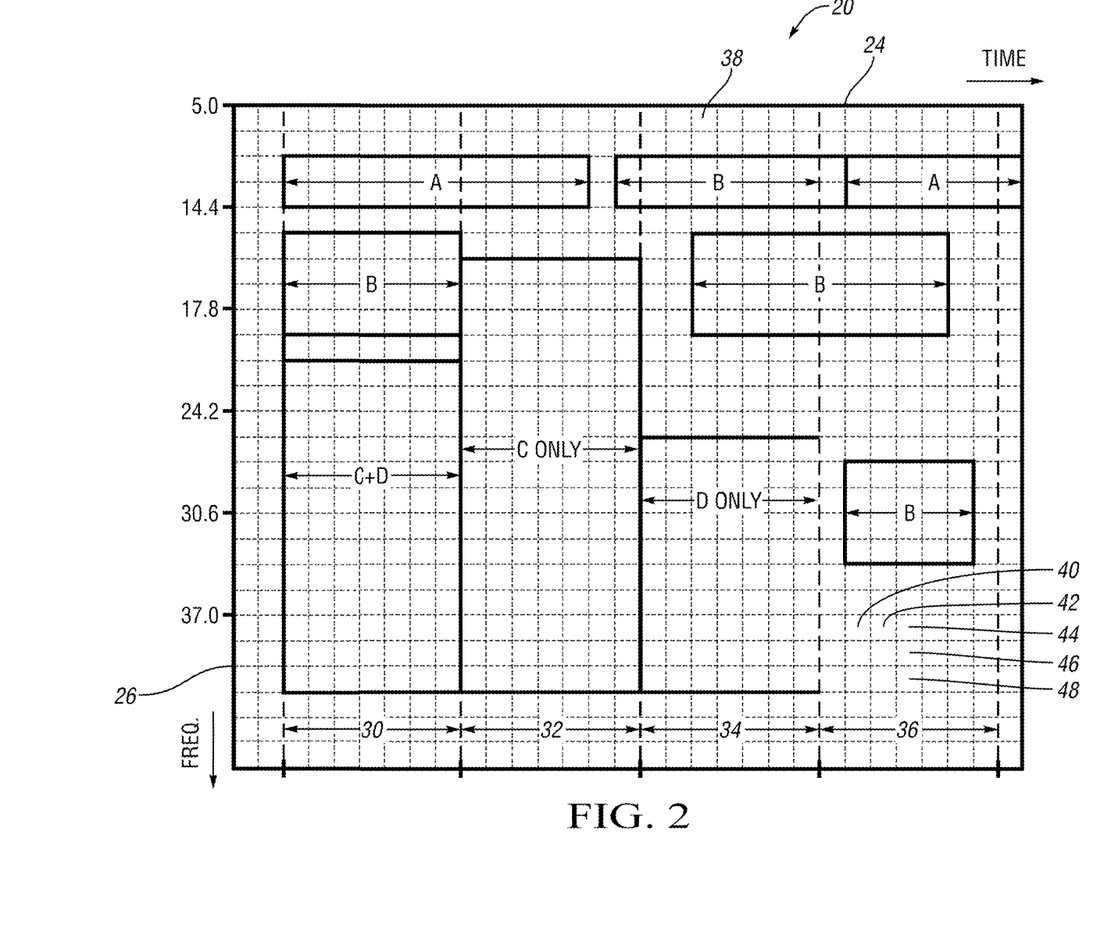
FIG. 2 illustrates a time-frequency grid in accordance with one non-limiting aspect of the present invention.

FIG. 2 illustrates a time-frequency grid 20 in accordance with one non-limiting aspect of the present invention. The scheduler 18 may be configured to schedule transmission opportunities for the terminal units 12 relative to the time-frequency grid 20. The time-frequency grid 20 is illustrated to define a time domain 24 and a frequency domain 26. The transmission opportunities are illustrated with cells, such as cell 38, that are rectangular shapes that comprise the time-frequency grid 20. Cells have both a time and frequency dimension. Cells 40, 42, and 44 are adjacent in time. Cells 44, 46 and 48 are adjacent in frequency. Each transmission opportunity may be defined relative to the time domain 24 and the frequency domain 26 to specify a bandwidth and duration for signals to be transmitted for particular one of the terminal units 12.

The scheduler 18 may be configured in accordance with the present invention to adjust the configuration of each transmission opportunity according to the particular operating characteristics of the terminal unit 12, such as to prevent transmission collisions. The time-frequency grid 20 is also shown to be divided into four block times 30, 32, 34, 36. Each block time corresponds with a particular interval of the time domain during which transmissions, such as OFDM transmissions requiring fixed transmission intervals, are segmented Each block time 30, 32, 34, 36 maybe comprised of a number of cells selectable by scheduler 18. The OFDM transmission opportunities are shown to vary depending on the corresponding block time 30, 32, 34, 36 in order to demonstrate the ability of the scheduler 18 to vary transmission opportunities. The scheduler 18 may be configured to maximize use of available bandwidth and/or to prioritize communications of one terminal unit over another. The scheduler 18 may also have other considerations in assigning cells to particular terminals. For example, it may be desirable to prevent optical beat interference (OBI) in radio frequency over glass (RFoG) transmission systems, or to compensate for a particular terminal not having sufficient transmit power.

The cable modem 12 scheduled to transmit during each transmission opportunity is identified with one of the alpha-numeric characters A, B, C and D. The transmission opportunities may be scheduled depending on an amount of data requested by the cable modems 12 for transmission, a priority of one cable modem 12 over another cable modem, or some other strategy. The scheduling generally corresponds with identifying the one or more cable modems 12 that are to communicate and the amount of data needed to be communicated. The scheduler 18 may be configured to determine some or all this information and/or another device may provide the relevant information to the scheduler 18. The first block time 30 is scheduled to provide transmission opportunities for each of the cable modems A, B, C, D, the second block time 32 is scheduled to provide transmission opportunities for the cable modems A and C, the third block time 34 is scheduled to provide transmission opportunities for the cable modems B and D, and the fourth time block 36 is scheduled to provide transmission opportunities for the cable modems A and B. This exemplary scheduling is presented to demonstrate some of the variability and capabilities of the scheduler 18 and is not intended to necessarily limit the scope and contemplation of the present invention.

The cable modem A is shown to be fixed to a particular bandwidth (e.g., 3.2 MHz) having a fixed width (W) in the frequency domain 26 due to the limitations of its operating characteristics. This frequency limitation requires the corresponding transmission opportunities to coincide with the same portion of the frequency domain 26 (see block times 30, 32 and 36 where transmission opportunities for cable modem A coincide with the same bandwidth). A duration/length (L) in the time domain of the transmission opportunities scheduled for the cable modem A during the block times 30, 32 and 36 are shown to be adjusted according to an amount of data being transmitted, i.e., the duration one transmission opportunity may be longer than another when more data is desired to be transmitted. The cable modem A may be characterized as having a fixed frequency or frequency domain characteristic, or at least one that is not dynamically changeable by the scheduler 18, and a variable duration or time domain characteristic. The scheduler 18 may adjust a length of the transmission opportunities assigned to the cable modem A according to amount of data requiring transmission or according to the factors (e.g., the need to prioritize another terminal unit) but the scheduler 18 may be unable to rapidly change the frequency configuration associated with the cable modem A (the fixed frequency may be adjusted but the scheduler 18 may be prevented from making such adjustments on a burst-by-burst basis).

The cable modem B, unlike the cable modem A, is fixed to one of two possible bandwidths (e.g., 3.2 MHz or 6.4 MHz), thereby allowing the corresponding transmission opportunities scheduled in the four block times to occupy either 3.2 or 6.4 MHz. As with the cable modem A, the scheduler 18 may be limited to adjusting only a duration/length of the transmission opportunities assigned to the cable modem B to compensate for data variability or other adjustment factors since the bandwidth is constrained to one of the two bandwidths. Unlike the cable modem A, the scheduler 18 may schedule the cable modem B to transmit simultaneously at multiple center frequencies and multiple bandwidths (see block times 34 and 36). The cable modem B is shown to be scheduled with two transmission opportunities during the third block time 34, which may be beneficial in allowing the cable modem B to transmit more data during a particular block time 34 than it would otherwise be able to communicate if it were only assigned a single transmission interval during that block time 34. Optionally, one of the two transmission opportunities assigned to the cable modem B during the third block time 34 may overlap in the time domain relative to the other one of the two transmission opportunities, which may result from data transmission requirements necessitating the two transmission opportunities.

The cable modem C and the cable modem D are shown to share a transmission opportunity during the first block time 30. The scheduler 18 may schedule the cable modem C and the cable modem D to share the transmission opportunity due to the ability of the cable modems C, D to mix subcarriers. The subcarriers assigned within the shared transmission opportunity may be partitioned between the cable modem modems C, D, e.g., the cable modem C may be assigned to even subcarriers and the cable modem D may be assigned to odd subcarriers such that the subcarriers used to transmit data for each of the cable modems C, D are interlaced. The transmission opportunity for the second block time 32 is shown to be occupied entirely by the cable modem C, which may be desirable if the cable modem C requests to transmit a large amount of data. The transmission opportunity for the third block time 34 is shown to be occupied entirely by the cable modem D, which may be desirable if the cable modem C no longer desires data transmission or the cable modem D has priority. The transmission opportunities assigned to the cable modems C, D are shown to vary in the frequency domain for each of the first, second and third block times 30, 32, 34.

The cable modems C, D may have operating characteristics that allow them to be variable in the frequency domain 26 but fixed in the time domain 24. The time domain restrictions on the cable modems C, D may be such that the scheduler 18 is forced to fix the corresponding transmission opportunities in the time domain. The fixed time domain requirements of the cable modems C, D may limit the scheduler to make frequency domain adjustments in order to compensate for data transmission requirements, i.e., the bandwidth may be increased when more data is to be transmitted and decreased when less data is to be transmitted. The frequency dependent transmissions of the cable modems C, D may experience improved performance if a guard interval (GI) is included. The GI may be specified by the terminal uint 14. The scheduler 18 may not necessarily need to be responsible for specifying GI but the scheduler 18 may be responsible for adjusting the size of the schedule transmission opportunities to make room for the GI.

The cable modems C, D may experience improved signal transmission capabilities if signals are transmitted as shaped pulses. The shape pulses may be beneficial in constraining the associated transmitted energy in order to ameliorate leakage. If the signals during a particular transmission opportunity assigned to one of the cable modems C, D relates to an OFDM burst, such as one where the burst abruptly starts and stops, a wave ramp or raised cosine window can be integrated to eliminate or ameliorating out-of-band leakage. The use of shaped pulses may be assigned by the scheduler 18 or a network administrator or other network controller responsible for managing transmission quality. The use of GI and/or shape pulses may be transparent to the scheduler and/or the cable modems C, D at least in that the additional data associated therewith may simply be hidden as part of the entire amount of data considered by the scheduler 18 as being requested for transmission. In this manner, the scheduler 18 may not be required to process the GI or shape pulses other than to consider them as part of the data needing to be transmitted from the cable modems C, D.

Figure 3:
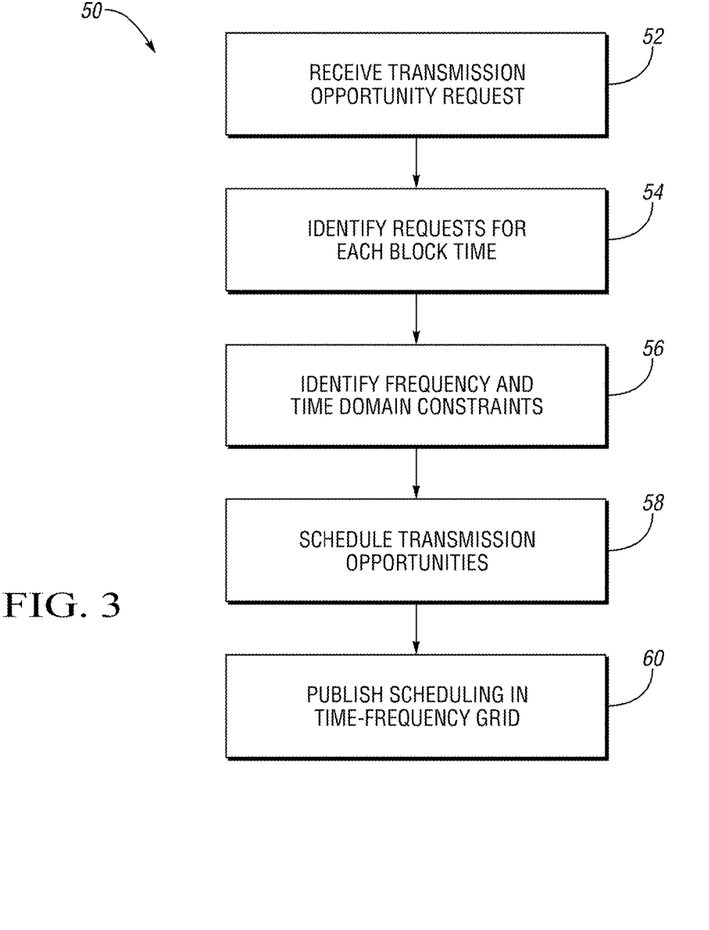
FIG. 3 illustrates a flowchart for a method of scheduling transmission opportunities in accordance with one non-limiting aspect of the present invention.

FIG. 3 illustrates a flowchart 50 for a method of scheduling transmission opportunities in accordance with one non-limiting aspect of the present invention. The method is described from the perspective of the scheduler 18 being configured to facilitate scheduling transmission opportunities. The processes and other operations necessary to facilitate implementation of the contemplated transmission opportunities scheduling may be facilitated with an application executing on the scheduler 18 and/or with other devices associated with a communication system 10, including the access point 12 and/or terminal units 12 associated with performing the desired transmissions. The scheduler may include a non-transitory computer-readable medium comprising computer-executable instructions stored therein for performing or commanding the contemplated transmission opportunity scheduling. The method is described with respect to a system configuration where terminal units desire transmission opportunities in order to facilitate upstream signaling through an access point configured to facilitate further upstream transmissions. The present invention is not necessary limited to upstream communications and contemplates scheduling downstream communications. The upstream communications are predominantly described as upstream communications may be susceptible to collisions and other inferences resulting from multiple terminal units attempting to transmit upstream over a common communication medium.

Block 52 relates to the scheduler receiving or otherwise identifying transmission opportunity requests. The transmission opportunity request may relate to requests issued from the terminal units and/or the access point to the scheduler in order to identify transmission opportunities. The scheduler may be configured depending on the particular network transmission requirements to specify cells for desired transmissions. The scheduler may be configured to identify the necessity of GI or shape pulses or to otherwise analyze parameters associated with signal transmissions when facilitating scheduling of the transmission opportunities and/or the scheduler may be configured to facilitate scheduling without having to necessarily process certain transmission requirements. The scheduler may, alternatively, be configured to perform the scheduling without having to identify the data to be transmitted during each block time, whether GI or she pulses should be used or other transmission related parameters. Instead, the scheduler may be more simply configured to identify the amount of data needed for transmissions, the terminal units intended to transmit during each cell and the transmission limitations of the terminal units so that the transmission opportunities can be scheduled in a manner that maximizes throughput and/or in a manner that achieves other desirable transmission characteristics, i.e., prioritizing transmission of one device over another instead of maximizing throughput.

Block 54 relates to the scheduler identifying the terminal units desiring to transmit, i.e., the terminal units that should be scheduled to transmit during one or more of the available cells or other specifiable intervals comprising the time-frequency grid. The scheduler may identify the terminal units from the transmission opportunity requests or based on a related request from a system administrator tasked with processing terminal unit originating request for transmissions. Once the terminal units scheduled for particular block time are identified, Block 56 relates to identifying frequency and/or time domain constraints for the corresponding terminal units. The frequency domain constraints may be particular to terminal units that transmit time domain symbols such that the corresponding terminal units can transmit signals within one or more fixed frequency bandwidths and with a transmission duration/length that is variable, i.e., the transmission duration is not required to approximately equal the block time. The time domain constraints may be particular to terminal units that transmit frequency domain symbols such that the terminal units can transmit signals at virtually any bandwidth but require a fixed duration/length for the corresponding transmissions, i.e., the transmission duration approximately equal to the block time.

Block 58 relates to scheduling transmission opportunities for the terminal units identified for each block time. This may include adjusting time domain and/or frequency domain variables depending on the capabilities of each terminal unit. The particular configuration (size and shape) of the transmission opportunities for each terminal may vary from block time to block time depending on any number of factors. The transmission opportunities may be scheduled according to a time-frequency grid where each transmission opportunity is defined with time domain and frequency domain parameters usable by the corresponding terminal unit to properly time their transmissions. Block 60 relates to the scheduler publishing a schedule or otherwise instructing the terminal units of the scheduled transmission opportunities. The scheduled transmission opportunities may be published for any number of transmitting units and for any period of time, which may be partitioned or segmented into cells.

As supported above, one non-limiting aspect of the present invention contemplates the use of OFDMA upstream for a future version of DOCSIS. This invention proposes the use of TDMA to switch between PHY layers at the CMTS to allow full usage of the available spectrum, or optionally without bonding the two PHYs together, in order to simplify device implementation. When a new PHY is initially deployed, the present invention contemplates that much of the existing upstream will be consumed with upstream carriers using the PHY for DOCSIS 2.0/3.0 devices, leaving very little available spectrum in which to run the new PHY. To address this, the present invention contemplates "bonding" the new PHY to the existing QAM carriers, so that all available spectrum could be used. This, however, introduces a lot of additional complexity, particularly since the two PHY layers will likely be very different. As an alternative, the present invention proposes to use TDMA to allow "switching" between the two PHYs at the CMTS, thereby allowing a new CM to operate only with the new PHY across all available spectrum, and avoiding the need for bonding these two PHYs together. This should improve both the efficiency of the modems or other devices scheduled for transmissions, as well as making them simpler.

It may be a cost/power savings if OFDMA devices do not need to bond OFDM transmissions with legacy QAM signals, while allowing the best possible usage of limited upstream spectrum. The present invention contemplates the use of "logical channels" in DOCSIS, where different devices transmit with different modulations upstream at different times, to achieve a similar result. As alternative, the contemplated "switching" may be distinguished from "logical channels" at least in that the OFDM "channel" may span across multiple QAM signals. The present invention contemplates making OFDMA devices compatible with legacy DOCSIS devices on upstream transmissions, without making the OFDMA devices "bond" the new OFDMA PHY with legacy QAM carriers. This may include using TDMA (time domain multiple access) to switch between OFDMA (for new cable modems), and QAM carries (legacy DOCSIS) for upstream burst transmissions.

The OFDMA carriers contemplated for use in accordance with the present invention may need to conform to relatively fixed block times, typically long enough to accommodate a guard interval and a number of symbols that are ideally two raided to an integer power, such as 4096 symbols. Legacy QAM carriers are more flexible on transmission time (specified in mini-slots), but must have fixed bandwidths, such as 6.4 or 3.2 MHz. As shown above in FIG. 1, a new CMTS may include a blade for receiving legacy ATDMA transmissions and another blade for receiving OFDMA transmissions. (Only the upstream path is illustrated). Thus legacy devices A and B would transmit to the QAM blade and new OFDMA devices C and D would transmit to the OFDMA blade; alternately, these could be two different functions on the same blade with an internal split. The CMTS scheduler contemplated by the present invention may be configured to give each CM cells with a transmission times and frequencies that prevents interference in either time or frequency. The appropriate blade would receive either the QAM transmission or the OFDMA transmission.

FIG. 2 illustrates transmissions in time vs. frequency where OFDMA devices may be assigned a block time. The QAM devices need frequency bandwidths, as illustrated as either 3.2 or 6.4 MHz. Thus in a first OFDMA transmission block, devices C and D transmit OFDMA in a 20.8 MHz wide block using different subcarriers. Thus backwards compatibility is maintained, latency is minimized, and bandwidth efficiency is held high. Note that the OFDMA transmission can use more powerful forward error correction relative to legacy QAM. The full flexibility of OFDMA transmissions can be employed to maximize throughput. For example, should a home have high attenuation, less OFDMA subcarriers can be used to maintain required signal to noise ratios. In order to keep the CMTS scheduler as simple as possible, it may be necessary to use a simpler scheme whereby only QAM carriers are used during one block of time, and only OFDMA is used during another block of time. In this case, there may be some issues getting the QAM transmissions to end at the same period of time. This can be alleviated either by using Continuous Concatenation and Fragmentation (for DOCSIS 3.0 devices) or simple fragmentation (from DOCSIS 1.1/2.0), so as to avoid wasted bandwidth due to some spectrum being unavailable for use during a given time. The 5-42 MHz bandwidth may be characterized as a contiguous block of OFDMA subcarriers, with spectral and temporal holes created for either QAM transmissions or discrete interferers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. In particular, in an optical implementation, the terminals 12 may transmit with different wavelengths instead of different frequencies. Tunable lasers could accomplish changing wavelengths.

What is claimed is:

1. A non-transitory computer-readable medium having a plurality of non-transitory instructions which when executed with a processor are sufficient to facilitate controlling a cable modem termination system (CMTS) to schedule transmission intervals for a plurality of devices communicating over a common communication medium when at least a portion of the plurality of devices are time division multiple access (TDMA) devices cable modems and at least a portion of the plurality of devices are frequency division multiple access (FDMA) cable modems, the TDMA cable modems being inoperable as one of the FDMA cable modems, the non-transitory instructions being sufficient to facilitate:

scheduling the transmission intervals in a non-interfering manner such that the transmission intervals scheduled for the TDMA cable modems occur without interfering with the transmission intervals scheduled for the FDMA cable modems, thereby enabling the TDMA cable modems that are inoperable as one of the FDMA cable modems to communicate over the common communication medium with the FDMA cable modems.

2. The non-transitory computer-readable medium of claim 1 further comprising non-transitory instructions sufficient to facilitate scheduling the transmission intervals for a first TDMA cable modem of the TDMA cable modems and a first FDMA cable modem of the FDMA cable modems to simultaneously occur during a first block time without interference, including scheduling the first TDMA cable modem to communicate within a first bandwidth for a first duration and the first FDMA cable modem to communicate within a second bandwidth for a second duration, the first bandwidth being distinct from the second bandwidth to prevent bandwidth overlap.

3. The non-transitory computer-readable medium of claim 2 further comprising non-transitory instructions sufficient to facilitate fixing the second duration to approximate the first block time and to vary a width of the second bandwidth in proportion to an amount of data to be transmitted from the first FDMA cable modem such that the width of the second bandwidth is greater when more data is to be transmitted and smaller when less data is to be transmitted, thereby resulting in the second bandwidth being variable depending on the amount of data to be transmitted from the first FDMA cable modem during the first block time.

4. The non-transitory computer-readable medium of claim 3 further comprising non-transitory instructions sufficient to facilitate additionally varying the width of the second bandwidth in proportion to available bandwidth such that for the same amount of data the width of the second bandwidth is greater when more bandwidth is available and smaller when less bandwidth is available, the available bandwidth being determined based on bandwidth dedicated for use by other FDMA or TDMA cable modems scheduled to transmit during the first block time.

5. The non-transitory computer-readable medium of claim 2 further comprising non-transitory instructions sufficient to facilitate scheduling the transmission intervals for the first block time such that a third FDMA cable modem is scheduled to communicate within the second bandwidth during the second duration, the third FDMA cable modem being operable as one of the TDMA cable modems.

6. The non-transitory computer-readable medium of claim 5 further comprising non-transitory instructions sufficient to facilitate instructing the first and the third FDMA cable modems to interlace transmitted signaling during the second duration, the first TDMA cable modem being unable to commensurately interlace signaling.

7. The non-transitory computer-readable medium of claim 5 further comprising non-transitory instructions sufficient to facilitate instructing the first FDMA cable modem to transmit signaling over even subcarriers within the second bandwidth and the third FDMA cable modem to transmit signaling over odd subcarriers within the second bandwidth, the first TDMA cable modem being unable to selectively transmit over no more than even or odd subcarriers.

8. The non-transitory computer-readable medium of claim 2 further comprising non-transitory instructions sufficient to facilitate fixing the first bandwidth and to facilitate varying a length of the first duration in proportion to an amount of data to be transmitted from the first TDMA cable modem such that the length of the first duration is greater when more data is to be transmitted and smaller when less data is to be transmitted, thereby resulting in the first duration being variable depending on the amount of data to be transmitted by the first TDMA cable modem during the first block time.

9. The non-transitory computer-readable medium of claim 8 further comprising non-transitory instructions sufficient to facilitate additionally varying the length of the first duration in proportion to a time length of the first block time such that the length of the first duration is greater when more time length is available and smaller when less time length is available, the available time length being determined based on time dedicated for use by other TDMA cable modems scheduled to transmit at the first bandwidth during the first block time, the first TDMA cable modem and the other TDMA cable modems being incapable of communicating within the second bandwidth.

10. The non-transitory computer-readable medium of claim 2 further comprising non-transitory instructions sufficient to facilitate selecting the first bandwidth to be fixed to one of a plurality of available bandwidths, excluding one or more of the plurality of available bandwidths allocated for use by other TDMA and FDMA cable modems also scheduled to transmit during the first block time.

11. The non-transitory computer-readable medium of claim 10 further comprising non-transitory instructions sufficient to facilitate scheduling the first bandwidth to be one of 3.2 MHz and 6.4 MHz and the second bandwidth to be greater than the first bandwidth, the TDMA cable modems being incapable of communicating outside of the first bandwidth.

12. The non-transitory computer-readable medium of claim 11 further comprising non-transitory instructions sufficient to facilitate scheduling the second bandwidth to equal a value corresponding with 42 MHz minus the first bandwidth, the FDMA cable modems being capable of communicating within the first bandwidth and the second bandwidth.

13. The non-transitory computer-readable medium of claim 1 further comprising non-transitory instructions sufficient to facilitate transmitting scheduling instructions to the FDMA and TDMA cable modems, the scheduling instructions detailing the transmission intervals and other information needed to transmit signaling from the FDMA and TDMA cable modems over the common communication medium, the scheduling instructions limiting the TDMA cable modems to communicating over the common communication medium using one or more of a first plurality of frequencies due to the TDMA cable modems being incapable of communicating over one or more of a second plurality of frequencies available to the FDMA cable modems for communicating over the common communication medium, the second plurality of frequencies being different than the first plurality of frequencies, the FDMA cable modems being capable of communicating over the common communication medium using each of the first plurality of frequencies.

14. The non-transitory computer-readable medium of claim 1 further comprising non-transitory instructions sufficient to facilitate characterizing each of the plurality of cable modems to be one of the TDMA and FDMA cable modems based on identifying information transmitted therefrom, the identifying information indicating whether the corresponding cable modem operates at a fixed bandwidth and a variable bandwidth, the cable modems operating at the fixed bandwidth being characterized as the TDMA cable modems and the cable modems operating at the variable bandwidth being characterized as the FDMA cable modems.

15. A non-transitory computer-readable medium having a plurality of non-transitory instructions which when executed with a processor are sufficient to facilitate scheduling transmission intervals during which one or more of a plurality of cable modems are authorized for transmitting signaling over a common communication medium to a cable modem termination system (CMTS), the non-transitory instructions being sufficient to facilitate:
  determining transmission requests issued from the plurality of cable modems for requesting the transmission intervals for an upcoming period of time;
  determining transmission limitations for the plurality of cable modems based on information included within the transmission requests;
  determining based on the transmission limitations at least a portion of the plurality of cable modems to be time division multiple access (TDMA) cable modems and at least a portion of the plurality of cable modems to be frequency division multiple access (FDMA) cable modems, the TDMA cable modems being determined from corresponding transmission limitations indicating a capability for transmitting signaling over the common communication at variable lengths in a time domain for the upcoming period of time and the FDMA cable modems being determined from corresponding transmission limitations indicating an incapability for transmitting signaling over the common communication at variable lengths in the time domain for the upcoming period of time; and scheduling the transmission intervals such that at least a first TDMA cable modem of the TDMA cable modems and at least a first FDMA cable modem of the FDMA cable modems simultaneously communicate over the common communication medium without interference.

16. The non-transitory computer-readable medium of claim 15 further comprising non-transitory instructions sufficient to facilitate:

determining the FDMA cable modems from corresponding transmission limitations indicating a capability for transmitting signaling over the common communication medium at a variable frequency or multiple frequencies for the upcoming period of time; and determining the TDMA cable modems from corresponding transmission limitations indicating an incapability for transmitting signaling over the common communication medium at the variable frequency or multiple frequencies and a capability for transmitting signaling over the common communication medium at a fixed frequency or no more than a single frequency for the upcoming period of time, the fixed frequency and the single frequency being outside of the variable frequency and the multiple frequencies.

17. A communication system comprising:

a plurality of time division multiple access (TDMA) devices having hardware componentry to facilitate signaling over a communication medium at a fixed frequency for a predefined period of time, the hardware componentry of the TDMA devices preventing signaling over the communication medium outside of the fixed frequency for the predefined period of time;

a plurality of frequency division multiple access (FDMA) devices having hardware componentry to facilitate signaling over the communication medium at a variable frequency for the predefined period of time;

a scheduler configured to schedule the TDMA and FDMA devices to communicate signaling over the communication medium without interference according to a time-frequency grid, the time-frequency grid cross-referencing a plurality of block times with a plurality of frequencies to define corresponding transmission intervals available for the TDMA and FDMA devices to communicate signaling over the communication medium; and wherein the FDMA and TDMA devices are cable modems and the communication medium terminates upstream communications therefrom at a cable modem termination system (CMTS).

18. The system of claim 17 wherein the scheduler includes a computer-readable medium having a plurality of non-transitory instructions which when executed with a processor associated therewith are sufficient to facilitate:

scheduling the transmission intervals within the time-frequency grid for at least a first TDMA device of the plurality of TDMA devices and at least a first FDMA device of the plurality of FDMA devices such that the first TDMA and FDMA devices communicate simultaneously over the common communication medium without interference;

determining an amount of data desired to be transmitted from the first TDMA and FDMA devices;

scheduling the transmission intervals for the first TDMA device to correspond with a single frequency value of the plurality of frequencies and a first quantity of the plurality of block times, the first quantity being proportional to the amount of data the first TDMA device desires to be transmitted such that the first quantity is greater when more data is to be transmitted and smaller when less data is to be transmitted; and scheduling the transmission intervals for the first FDMA device to correspond with a second quantity of the plurality of frequencies, the second quantity being proportional to the amount of data the first FDMA device desires to be transmitted such that the second quantity is greater when more data is to be transmitted and smaller when less data is to be transmitted.

19. The system of claim 17 wherein:

the hardware componentry of the TDMA devices facilitates signaling over the communication medium at variable lengths in the time domain for the predefined period of time; and the hardware componentry of the FDMA devices prevents signaling over the communication medium at the variable lengths for the predefined period of time.

* * * * *